Figure 1:
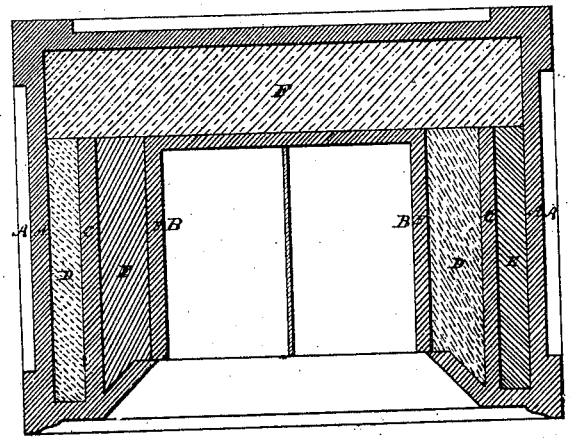

*J. P. Greely.*
*Safe.*

No. 97,079.   Patented. Nov. 23, 1869.

Witnesses   John P. Greely.
            by his attorney

UNITED STATES PATENT OFFICE.

JOHN P. GREELY, OF BOSTON, MASSACHUSETTS, ASSIGNOR TO HIMSELF, RUSSELL ARNOLD BALLOU, SANFORD GREELY, AND JONATHAN PEIRCE, OF SAME PLACE.

IMPROVEMENT IN FIRE-PROOF SAFES.

Specification forming part of Letters Patent No. 97,079, dated November 23, 1869.

*To all whom it may concern:*

Be it known that I, JOHN PEVEAR GREELY, of Boston, of the county of Suffolk and State of Massachusetts, have made a new and useful invention having reference to what are termed "Fire-Proof Safes" or "Fire-Resisting Safes;" and I do hereby declare the same to be fully described in the following specification.

In carrying out my invention I employ for the stuffing an ordinary safe lamp-black, either alone or in mixture with plaster-of-paris or any other suitable cement or material. Such, also, may be employed for the stuffing of the jacket of a steam-boiler or a pipe for the conveyance of steam or hot air, or for a common refrigerator, as used for the cooling or preservation of meats or other articles. A safe or other article so stuffed or lined or protected with a mass of lamp-black arranged against either or all of its sides or within such, becomes, in fact, an improved article of manufacture and of my invention.

In the application of lamp-black as a lining or stuffing to a common iron safe for the preservation of books, papers, &c., from fire, we not only have a homogeneous material, but one incapable of destruction or of being cracked by heat.

I am aware that carbon in the form of coal or ordinary charcoal has been used in refrigerators or meat-safes as a non-conductor of caloric; but lamp-black, although carbon, is essentially different in form and character and in the practical results following its use as a safe-stuffing. A diamond is carbon in a crystallized state. Lamp-black is carbon, also, in a peculiar condition. It is the products of flame and will not burn in ordinary temperatures, as it will endure long exposure to intense heat without any obvious change. While ordinary carbon in the state of charcoal is a slow conductor of caloric, lamp-black is almost a non-conductor of it.

For the mechanical application of lamp-black, as above specified, it is really another substance as respects charcoal, since it can be used where charcoal cannot, for the reason that the latter would be consumed when exposed to heat in a safe, whereas the lamp-black will retain its normal condition under very intense heat, especially when confined within or between the walls of a fire-resisting safe. Owing to the minute divisions of the lamp-black, it being in the state of an impalpable powder, it is capable of being condensed or packed to better advantage than charcoal or ground gypsum, and as a natural consequence air can be better excluded from a mass of it. Where ground gypsum and various other matters used in stuffing safes when exposed in a safe to great heat will give off water and carbonic acid or other gases and become cracked and rendered useless thereby, the lamp-black will retain all its useful properties and remain intact.

Of the accompanying drawing, Figure 1 is a horizontal section of a fire-resisting safe as provided with the lamp-black stuffing.

In this drawing, A is the outer iron wall, and B the inner wall, of the safe, C C being intermediate walls.

The lamp-black stuffing is shown at D D, an ordinary plaster-of-paris stuffing being also represented at E E. A stuffing composed of plaster-of-paris and lamp-black is shown at F. In one case the lamp-black stuffing is represented as between the outer wall and the cement or plaster stuffing. In the other case it is shown as between the inner wall and the cement or plaster stuffing, the lamp-black stuffing in either instance being separated from the cement stuffing by one of the intermediate walls.

My invention is based on the discovery I have made of the new properties of lamp-black when used as described in a safe, especially when exposed to great heat. I have discovered that it will not only retain its normal condition, but is a better non-conductor of heat than any known substance heretofore employed.

A great difficulty with the common kinds of stuffing heretofore employed is the liability to crack and contract, thereby allowing the heat to readily pass through the stuffing to the detriment of the contents of the safe. This is not the case with the lamp-black.

In further carrying out my invention the mass of lamp-black, when used alone in a space between the walls of a safe, is to be tamped or beaten down very closely or firmly, so as to render it very hard and compact and drive out of it most, if not all, the air. For the better effecting this in some cases water may be used, the material being made by it into a paste, and such compressed in the space between the safe-walls, so as to compact the mass and exclude the water and air. Any other well-known means of tamping or compacting the mass to render it sufficiently hard may be adopted.

I have subjected safes so made to hot fires for fifteen consecutive hours, and have brought the walls to a white-heat repeatedly without doing any injury to the contents, papers, or articles of the chambers of such safes. In fact, I have found it practically impossible to materially injure the contents when the safe is so made. The mass of lamp-black, before being put into the space for its reception, may be compacted or molded into the proper shape or shapes.

What I claim as my invention is as follows:

1. My improved manufacture or safe as having its heat-resisting stuffing composed either of lamp-black alone or such in mixture with plaster-of-paris or other equivalent material.

2. The employment of lamp-black as a stuffing for a safe, whether it (such lamp-black) be used alone for such or in connection or mixture with plaster-of-paris or other material.

3. The employment of lamp-black as a heat non-conducting stuffing for the jacket of a steam-boiler, pipe, or other article exposed or to be exposed to heat.

4. In a safe, the employment therein of a mass of lamp-black and the compacting of it, substantially as described, whereby a stuffing of a superior character tending to render the safe practically fire-resisting is produced.

5. A safe having its stuffing composed of lamp-black, compacted substantially as described.

JOHN P. GREELY.

Witnesses:
R. H. EDDY,
J. R. SNOW.